United States Patent [19]
Thompson

[11] Patent Number: 4,881,161
[45] Date of Patent: Nov. 14, 1989

[54] STEPPING MOTOR CONTROL
[75] Inventor: Murray A. Thompson, Madison, Wis.
[73] Assignee: Wisconsin Alumni Research Foundation, Madison, Wis.
[21] Appl. No.: 149,713
[22] Filed: Jan. 29, 1988
[51] Int. Cl.⁴ .............................................. G05F 1/00
[52] U.S. Cl. .............................. 364/167.01; 318/671; 318/685
[58] Field of Search ............... 318/671, 685, 696, 677, 318/571; 901/24; 364/130, 400, 513, 167.01

[56] References Cited
U.S. PATENT DOCUMENTS

3,908,195  9/1975  Leenhouts ........................... 364/130
4,588,937  5/1986  Fujioka et al. ...................... 318/677
4,710,691  12/1987  Bergstrom et al. ................. 318/685
4,714,867  12/1987  Palmin et al. ....................... 318/685
4,734,847  3/1988  Hunter ................................ 364/174

Primary Examiner—Allen MacDonald
Attorney, Agent, or Firm—Quarles & Brady

[57] ABSTRACT

A stepping motor control and driving circuit is provided to control stepping motors used to move a manipulator robot. The stepping motor control receives digital desired velocity and acceleration data from a controller computer and uses those instructions to generate and maintain appropriate control signals. The drive circuit, operating in response to the control signal, uses a summing amplifier responsive to output voltage and current to control the output impedance of the circuit.

19 Claims, 7 Drawing Sheets

STEPPING MOTOR CONTROL

FIELD OF THE INVENTION

The present invention relates to electronic control circuits for stepping motors in general, and relates in particular to digital computer controlled circuits for controlling the high performance operation of stepping motors.

BACKGROUND OF THE INVENTION

The concept of a stepping motor is that it may be incrementally moved, or "stepped" in a series of increments with each increment of travel being determined by a discrete unit of electrical input. The increments can be counted by digital circuitry, such as computer controlled circuitry, to determine the cumulative distance travelled by a stepping motor and thus its instantaneous position at any instant. Stepping motors are thus particularly advantageous to use for the implementation of computer controlled manipulation of real world objects, such as is often necessary in robotics. Thus stepping motor controllers are often utilized in robotic applications under the control of a microprocessor or a computer.

SUMMARY OF THE INVENTION

The present invention is summarized in that a stepping motor control circuit includes both a digital controller to receive data from the controlling computer and create the driving signals for the stepping motor and a driving circuit to amplify the driving signal for efficient application to the motor. The digital controller receives desired velocity and acceleration values from the computer and then uses those values to increment velocity and position registers over time to generate the driving signal. The driving circuit uses voltage and current feedback to control its effective output impedance presented to the motor and chopping circuits presenting the power to the motor.

It is an object of the present invention to provide a control and drive circuit for stepping motors which operates under digital control so as to be easily operable and controlled by a general purpose digital computer.

It is another object of the present invention to provide a drive and control circuit for stepping motors which allow for maximum torque and speed while still allowing for very fine and tightly controlled operation of the motor within tightly defined limits.

It is another object of the present invention to provide such a drive and control circuit for a stepping motor which can utilize high voltages safely and easily without the need for dissipating any back EMF from the stepping motor during its operation.

Other objects, advantages, and features of the present invention will become apparent from the following specification when taken in conjunction with the accompanying drawings.

DESCRIPTION OF THE PREFERRED EMBODIMENT

Figure 1:
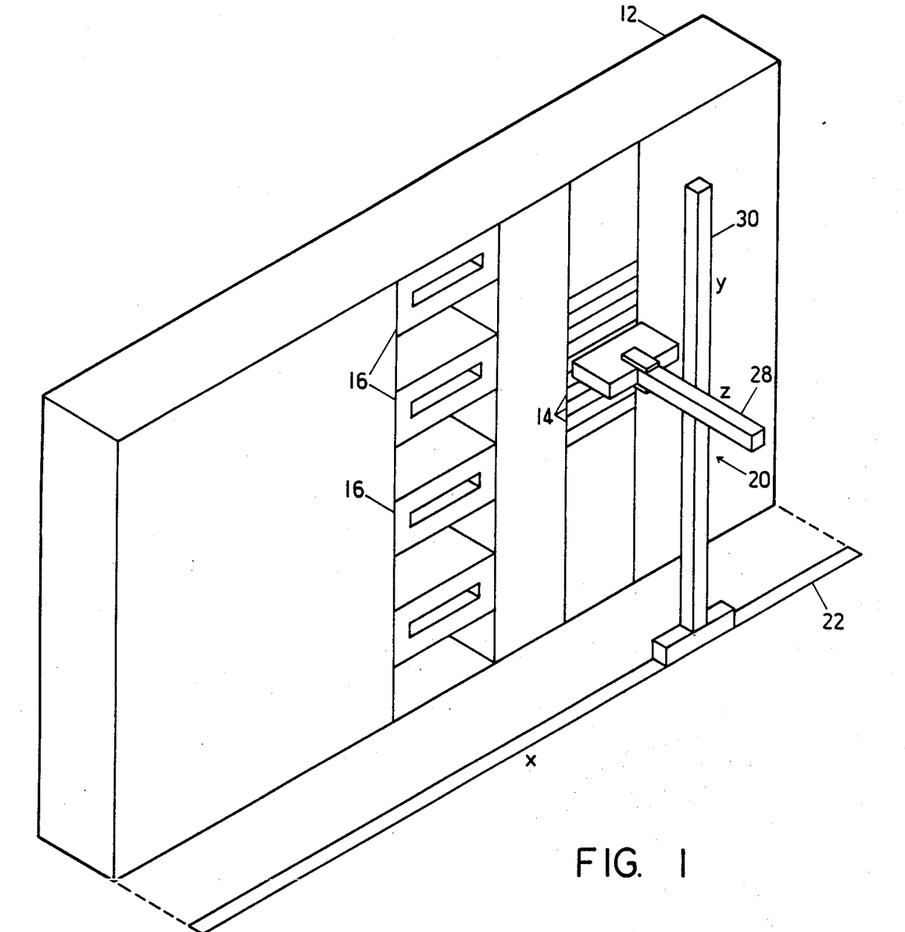
FIG. 1 is a perspective schematic view of an optical archive storage unit constructed in accordance with the present invention which includes therein a three-dimensional robot arm controlled by stepping motors.

Shown in FIG. 1 is a schematic illustration of an optical archive storage unit constructed utilizing the stepping motor drive and control circuits of the present invention. The optical archival store unit illustrated in FIG. 1 includes a large cabinet 12 in which a number of write once but read many times optical disks 14 are stored in racks in the cabinet 12 for retrieval under the control of a controlling computer (not shown). A series of read/write units 16 capable of reading and writing on the optical disks 14 are located at a central rack in the cabinet 12. A robot 20 is provided with the physical capability of grasping an optical disk 14 and carrying it either from its storage location to a read/write unit 16 or to return it from the read/write unit 16 to its storage location. In order to accomplish this transportation of the optical disk 14, the robot must have motion in each of three dimensions indicated "X," "Y" and "Z" in FIG. 1.

The robot travels horizontally along the X axis on a pair of horizontal tracks 22 (only the lower one is shown in FIG. 1) located in the floor and ceiling respectively. 5 A stepping motor (not shown) is connected by suitable gearing to a gear pinion on the upper track to serve to move the robot horizontally. The robot has an arm 28 which can move up and down the vertical bar 30. A stepping motor (not shown) is provided on the arm 28 also with a cog gear on its output which travels along a pinion on the vertical bar 30. Thus the stepping motor on the arm 28 may move the arm 28 up and down to provide vertical motion along the Y axis. Similarly, but also not shown, another stepping motor is provided with another geared mechanism to drive the disk cartridge grasping mechanism at the end of the arm horizontally toward and away from the vertical bar 30 in the Z direction.

In other words, the robot 20 of FIG. 1 has all of its motive force provided by three stepping motors, each of which operates linearly on an axis orthogonal to the axes of operation of the other two stepping motors. Because the demands for these stepping motors are very high requiring fast acceleration but quite precise control, so that the optical disk cartridges and the read-write drives are not damaged, the controls for the stepping motors must be capable of extreme but controlled acceleration as well as fine adjustment.

The stepping motor drive and control system in accordance with the present invention is intended for operation by a digital computer. As implemented by the applicants, one computer manages the overall organization and access to the files in the archive storage system and a second subsidiary computer operates the robot 20 through the stepping motor control and drive circuit of the present invention. A suitable digital computer for operating the circuit of the present invention is a one-board version of a PDP 11/03, referred to as a "Falcon," which may be used to control the circuit as described below. As will become apparent from the following description, operation of the controller, and its respective operation of the drive, is readily changeable and can be readily customized under software control. Of course, other digital computers are equally adaptable for use with this circuitry.

Figure 2:
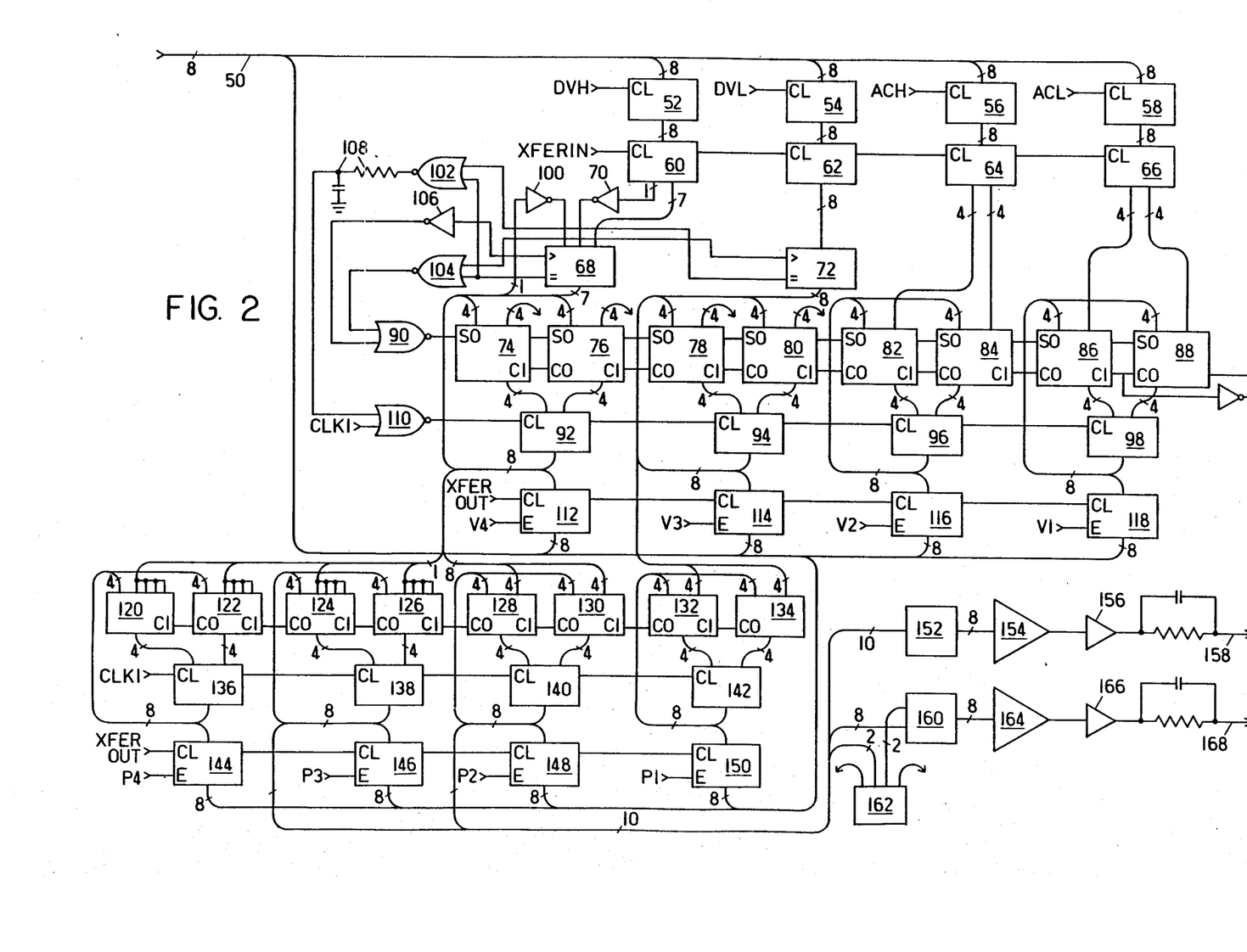
FIG. 2 is a schematic circuit diagram of a portion of the digital controller circuit for the stepping motor control and drive circuit of the present invention.
Figure 3:
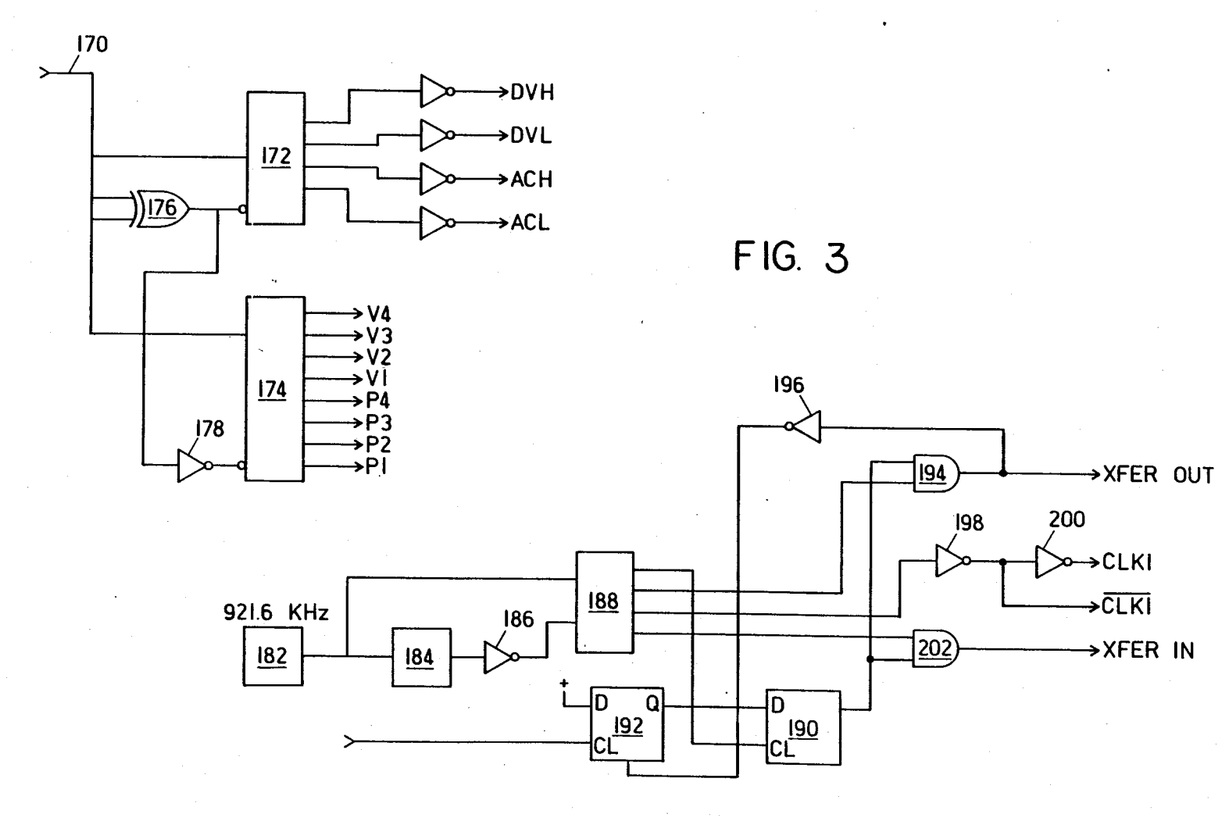
FIG. 3 shows additional portions of the controller circuit as principally contained in FIG. 2.

Shown in FIGS. 2 and 3 is a stepping motor digital controller circuit. This circuit is intended for operation by a general purpose digital computer, such as the Falcon. In FIG. 2, each of the locations in which a plurality of digital logic lines are connected in parallel, such as a data bus, is indicated by a single line connection with indication adjacent to that line how many signal lines are actually present. Thus, for example, there is an data bus 50, which consists of an eight-bit data bus from a suitable interface to the computer controlling the operation of the circuit of FIGS. 2 and 3. The eight-bit data bus 50 is connected to the inputs of four input buffer latches 52, 54, 56 and 58. The eight-bit, or one-byte, output of each of the input buffer latches 52 through 58 is connected as an input to a respective one of four input latches 60, 62, 64 and 66. Each of the input buffer latches 52 through 58 has a separate input control to cause them to clock, or latch data therein, while all of the input latches 60, 62, 64 and 66 have their clock or latch inputs tied together connected to a common signal line designated XFERIN. The eight bits of output of the input latch 60 are all connected as an input to a comparator 68. The seven least significant bits of the output of the input latch 60 are connected directed to the seven least significant inputs to the comparator 68, but the most significant output bit from the input latch 60 is connected through an inverter 70 to the most significant bit input to the comparator 68. The eight-bit output of the input latch 62 is connected directly as an input to a comparator 72.

Indicated by the reference numerals 74, 76, 78, 80, 82, 84, 86 and 88 are a cascaded series of four bit adders which are connected to form a sixteen-bit adder. All of the adders 74 through 78 have their directional input signal connected to the output of a NOR gate 90. Each of the adders 74 through 88 is cascaded, with the carry or overflow of the adder 88 connected to the carry input to the adder 86, whose carry output is connected as a carry input to the adder 84, and so on through the adder 74. Each of the adders 74 through 88 adds two four-bit inputs together. The eight-bit output of the input latch 66 is bifurcated, and each set of four bits is connected as an input to a one of the adders 88 and 86. The eight-bit output of the latch 64 is similarly split between the adders 84 and 82. One set of four-bit inputs to the adders 74, 76, 78, and 80 are all connected to ground. Associated with each pair of the adders 74 through 88 is one of four eight-bit velocity latches 92, 94, 96 and 98. The latches 92 through 98 function to hold a four-byte, or 32 bit, numerical value of the velocity which is to be the output of the controller circuit. The latches 92 through 98 therefore function to as a single unitary 32-bit velocity register. The eight-bit output of the adders 86 and 88 connect as an input to the velocity register 98, while the output of the velocity register 98, which is eight-bits, has its four least significant bits connected as an input to the adder 88 and its four most significant bits connected as an input to the adder 86. Similarly, the velocity latch 96 receives four input bits from each of the adders 84 and 82 and its eight-bit output has the four least significant bits connected as an input to the adder 84 while its four most significant bit outputs are connected as an input to the adder 82. The velocity latch 94 receives its inputs from the adders 80 and 78 and its eight-bit output is connected four bits to the adder 80 and four bits to the adder 78. In addition, the entire eight-bit output of the velocity latch 94 is connected as a second eight-bit input to the comparator 72. The velocity latch 92 receives its inputs from the adders 76 and 74 and has its eight-bits of output divided between the adders 76 and 74. The velocity latch 92 also has all eight of its output bits connected as inputs to the comparator 68, with its most significant output bit being connected through an inverter 100 before connected as an input to the comparator 68.

Associated with the comparators 72 and 74 are a pair of NOR gates 102 and 104 and an inverter 106. Both of the outputs of the comparators 68 and 72 which indicate that their eight-bit inputs are equal are connected as inputs to the NOR gate 102. The outputs of both comparators 68 ad 72 are low when true. The output of the NOR gate 102 is connected through an RC circuit 108 to the input to a NOR gate 110. The output of the NOR gate 110 is connected as a clocking or latching input to each of the velocity latches 92 through 98. Another input to the NOR gate 110 is a signal which is the inverse of the signal CLK 1. The NOR gate 104 has as its inputs the equality output from comparator 68 and the output signal from comparator 72 which indicates that the output of the velocity latch 92 is of larger value than the output of the input latch 62. The output of the NOR gate 104 is connected as an input to the NOR gate 90, the other input of which is connected to the output of the inverter 106. The input to the inverter 106 is connected to the output of the comparator 68 which indicates that the value in velocity latch 92 is greater than that in input latch 60. Each of the velocity latches 92 through 98 has associated with it a respective one of eight-bit tri-state velocity output buffer latches 112, 114, 116, and 118. The clock inputs to the velocity output buffer latches 112 through 116 are all connected to a signal XFEROUT. Each of the enable inputs to the respective tri-state buffer latches 112 through 118 is separately connected to signals designated V1 through V4 which will be described later. The data inputs to all of the buffer latches 112 through 118 are connected to the respective velocity latches 92 through 98. The tri-state eight-bit outputs of the buffer latches 112 through 118 are all connected to the same eight-bit data bus 50 which is the input to the input buffer latches 52 through 58.

The circuit of FIG. 2 also contains a second cascaded series of four-bit adders designated 120, 122, 124, 126, 128, 130, 132 and 134. Again the four-bit adders 120 through 134 are connected as a cascaded thirty-two bit or four-byte adder. The eight-bit output of the velocity latch 94 is split and the four least significant bits are connected as an input to the adder 134 while the four most significant bits are connected as an input to the adder 132. Similarly, the eight-bit output of the velocity latch 92 is connected with four bits as inputs to the adders 130 and 128. In addition, the most significant output bit of the velocity latch 92, indicating the polarity of velocity, is connected to all four of the input bits to one set of inputs to each of the adders 120, 122, 124, and 126. A series of four eight-bit position latches 136, 138, 140 and 142 combine to form an eight-byte or thirty-two bit position register. All of the four position latches 136 through 142 have a common clock or data latch input which is clocked by the signal CLK 1. The position latch 142 receives four input bits from the output of each of the adders 134 and 132 and has four-bits of its eight-bit output connected as an input to each of the adders 134 and 132. The same wiring scheme is repeated for the position latches 140, 138, 136 and their respective pairs of adders 130 and 128, 126 and 124, and 122 and 120. Associated with each of the position latches 36 through 142 is one of four eight-bit tri-state position output buffer latches 144, 146, 148 and 150. The output of each of the tri-state position buffer latches 144 through 150 is also connected to the eight-bits of the data bus 50. The clock inputs to each of the buffer latches 144 through 150 is connected to the signal XFEROUT. The enable input to each of the tri-state buffer latches 144 through 150 is connected to a separate signal designated P1 through P4 as will be described below.

The seven most significant output bits from the position latch 140 and the three least significant output bits from the position latch 130 are connected as a ten-bit input to an ROM 152. The ROM 152 contains a lookup table which, in essence, converts the numerical value of its ten input bits to a sine function. The eight output bits from the ROM 152 are connected as an input to a digital to analog converter 154. The output of the digital analog converter 154 is connected as an input to a driver amplifier 156 which drives the output of the circuit of FIG. 2 through signal line 158. Suitable capacitive and resistive coupling may be used to connect the output of the amplifier 156 through the signal line 158 and to provide adjustments as necessary. The eight least significant bits of the ten bit input bus to the ROM 152 are also connected to a second ROM 160. The two most significant bits in the ten-bit input bus to the ROM 152 are connected to an adder 162 which is wired so as to add to the value on those two input bits. The output of the adder 182 is connected as an input to the ROM 160. The adder 162 is wired so that the numerical value presented as a ten-bit input word to the ROM 160 is precisely one-quarter cycle, or pi radians divided by two, greater than the value presented as an input to the ROM 152. The eight-bit output of the ROM 160 is provided as input to a digital to analog converter 164 the output of which is connected to an amplifier 166. The amplifier 166 drives an output line 168 through suitable resistance or capacitive coupling as may be appropriate.

Shown in FIG. 3 are other supporting components for the controller circuit, as principally illustrated in FIG. 2. In addition to the eight-bit data bus 50 as illustrated in FIG. 2, another connection to the computer controlling the operation of the controller of FIGS. 2 and 3 is a five-bit control or address bus 170. Four of the five bits of the control bus are connected directly as inputs to a pair of demultiplexers 172 and 174. The two most significant bits of the five bit control bus 170 are connected as inputs to an exclusive OR gate 176 which connects directly to the load, or enable, input to the demultiplexers 172 and is connected through an inverter 178 to a similar input on the demultiplexer 174. The outputs of the demultiplexer 172 are each connected to a one of respective inverters 180 to create a one of four signals designated in FIG. 3 as DVH, DVL, ACH, and ACL. As may be seen by referring to FIG. 2, each one of these signals is an input to a respective one of the input buffer latches 52, 54, 56 and 58 to cause the latches to be enabled to clock in the value presented to the input thereof. The outputs of the demultiplexer 174 consists of a series of signals, designated V4, V3, V2 and V1 which, again by referring to FIG. 2, may be seen to be the enable input to the tri-state velocity buffer latches 112, 114, 116, and 118. Similarly, four additional outputs from the demultiplexer 174 consists of signals P4, P3, P2, and P1, each of which is a respective enable input to one of tri-state position buffer latches 144, 146, 148, and 150.

Also illustrated in FIG. 3 is a clocking and timing circuit which has one of its components a clock 182. The clock 182 is constructed so as to operate at 921.6 kilohertz. The output of the clock 182 is connected as an input to a counter 184 which is connected so as to divide by fourteen its input clocking pulse. The output of the counter 184 is connected through an inverter 186 as a data input to a shift register 188. The clock input to the shift register 188 is connected directly from the clock 82. This manner of connection of the clock 182 through the counter 184 to the shift register 188 causes the shift register to be loaded each 15.191 microseconds with a single digit positive bit which is shifted each 1.0851 microseconds to give four successive distinct clock pulses on each of its output lines at intervals of 1.0851 microseconds. Its first output bit is connected as a clock input to a flip-flop 190. The data input to the flip-flop 190 is connected to the data output of a flip-flop 192 whose data input is wired to the positive supply and whose clock input is supplied by an input pulse provided from the computer controlling the circuit of FIGS. 2 and 3. The second bit output from the shift register 188, and the data output of the flip-flop 190, are each connected as inputs to an AND gate 194 which generates the signal designated as XFEROUT. That signal, as may be seen by referring to FIG. 2, controls the clocking of the velocity output buffer latches 112 through 118 as well as the position output buffer latches 144 through 150. The output of the AND gate 194 is also connected through an inverter 196 to the reset input to the flip-flop 192. The third output bit of the shift register 188 is connected through a pair of inverters 198 and 200 to create the signal CLK 1 and its inverse. The next two output bits of the shift register 188 are not connected. The fifth output bit of the shift register 188 is connected as an input to an AND gate 202, the other input of which is also connected to the output of flip-flop 190, and the output of the AND gate 202 creates the signal XFERIN which, again referring to FIG. 2, is connected as a clocking input to the input latches 60 through 66.

It would be useful at this time to describe the operation of the controller circuit of FIGS. 2 and 3 since its operation may be understood separately and distinctly from the drive circuitry of FIGS. 4 through 6, which will be discussed below. In essence, the controller of FIGS. 2 and 3 is intended to operate under the control of the digital computer to generate a signal to be transmitted to the drive circuit in relation to the input information provided to it by the computer. The computer gives the control circuit of FIGS. 2 and 3 two two-byte input values. One value represents a sixteen-bit acceleration magnitude signal and the other sixteen-bits represents a desired velocity. The desired velocity value is actually a fifteen bit value with a polarity as its most significant bit and may therefore be appropriately represented in two's complement form. In essence, the computer tells the control circuit of FIGS. 2 and 3 achieve a designated sixteen-bit velocity and use a designated sixteen-bit acceleration value as the rate of change of velocity in moving the desired velocity. The circuit of FIGS. 2 and 3 generates a position output signal, in response to those inputs, and it slowly increments or decrements existing velocity, at a rate as determined by the acceleration input, to ultimately achieve the desired velocity. The velocity value is constantly incrementally added to the position value. The output signals of the controller circuit, designated 158 and 168 are a pair of sine wave signals which are 90 degrees out of phase. In essence, they represent the sine and co-sine of the same function. The rate of variation of these signals is the rate of operation of the stepping motor.

In detail, when the computer desires to transmit information to the circuit of FIGS. 2 and 3, it is necessary first to load the appropriate values for the desired velocity and for the acceleration value to the control circuit. This is done by presenting the values, in eight-bit bytes, on the data bus 50. At the same time as each data byte is presented on the data bus 50, information is presented on the control bus 170 designating the appropriate input buffer latch 52 through 58 into which each byte of the information is to be entered. The signal on the control bus 170 is demultiplexed by the demultiplexer 170 and the appropriate signal, i.e. respectively DVH, DVL, ACH, or ACL, actuates a one of the input buffer latches 52, 54, 56, or 58. In other words, the computer presents each byte to all of the latches and then actuates only the appropriate latch which is the intended address for the byte it wishes to load into the system. The computer then clocks flip-flop 192 to actuate the clocking circuit located on FIG. 3. When the flip-flop 192 goes positive, it provides a positive input to the flip-flop 190. The clock generator composed of the combination of the clock 182, divider 184, and shift register 188 is continually recycling. When the appropriate portion of the cycle is reached in which a positive edge is presented to the clock input to the flip-flop 190, the flip-flop 190 is triggered to go high. The high signal at the output of the flip-flop 190 is retained when the shift register 188 shifts to its next output bit. This causes two high inputs to the gate 194 which actuates the signal XFEROUT. At the same time, the flip-flop 192 is reset. The signal XFEROUT will time out when the shift register 188 is next clocked, and will be followed by the signal CLK 1 and its inverse. Some time later, the signal XFERIN will be actuated at the fifth output bit of the shift register 188. On the next cycle of the shift register 188, the flip-flop 190 will also be reset as its input will be the output of the now reset flip-flop 192 the next time it is clocked. Note that the signals CLK 1 and its inverse continue constantly regardless of the state of the flip-flops 190 and 192.

In the main portion of the control circuit of FIG. 2, the signals XFEROUT and XFERIN serve to control the timing of loading information out of and into the system. The signal XFEROUT is used to clock information into all of the output buffer latches 112 through 118 and also 144 through 150. The signal XFERIN is used to clock input into the input latches 60 through 66. Thus, when a signal XFERIN is presented, the input latches 60 through 66 clock into them the output of the input latches 52 through 58. Thus, although the computer may use multiple cycles of its operation to individually load each of the input buffer latches 52 through 58, it can load the information into the input latches 60 through 66 simultaneously through a single pulse created on signal XFERIN, in order to avoid any ambiguity during the loading of data into the system.

In loading the input buffer latches 52 through 58, and thereby also the input latches 60 through 66, the sixteen-bit value of the desired velocity is introduced through latches 52 and 54 to latches 60 and 62. The sixteen-bit value of the acceleration is loaded through latches 56 and 58 into latches 60 and 66.

In essence, the function of the circuitry consisting of the adders 74 and 88 in conjunction with the velocity register consisting of latches 92 and 98 is to incrementally add to the velocity value the acceleration value contained in the input registers 64 and 66. The velocity register, consisting of latches 92 through 98, is a thirty-two-bit value representing the present velocity of driving signal to the stepping motor. The most significant sixteen bits, contained in latches 92 and 94, are defined to be above the binary point while the least significant sixteen bits, held in latches 96 and 98, are below the binary point. The sixteen bits of velocity information above the binary point is continually compared to the desired velocity as contained in input latches 60 and 62. This comparison is done by comparators 68 and 72.

The output of the comparators 68 and 72 is connected through the gating consisting of gates 104 and 90 to the adders 74 through 88. The clock input to the NOR gate 110 clocks the value from the output of the adders into the velocity registers consisting of latches 92 through 98 every 15.191 microseconds. The output of the NOR gate 102 is intended to block the clocking input through the NOR gate 110 whenever the velocities are equal, so that no further chance in the velocity register occurs until directed by the computer. Thus, the combination of the velocity register, consisting of latches 92 through 98, and adders 74 through 80, adds or subtracts an increment of the acceleration magnitude to the lower bits of the value in the velocity register every fifteen microseconds until the highest bits of the velocity register equal the desired velocity, at which time such addition ceases. At any time, the computer may inquire, through generating a strobe signal on XFEROUT, and sequentially reading each of the tri-state velocity output buffer latches 112 through 118 to see what the present value of the velocity register is. Thus the computer has the capability to continually monitor the progress of the velocity register as appropriate.

The latches 136 through 140 function as a thirty-two-bit position register. The sixteen bits contained in latches 136 and 138 are defined to be above the binary point of this value while the values in latches 140 and 142 are below that value. In essence, in a similar fashion that acceleration was added in increments to the lower bits of the velocity register at each clock period, the velocity is added in increments during each clock period to the position register. Therefore, the adders 128 through 134 are each connected to add to the output of the respective eight-bit position latches 140 and 142 the output of the respective eight-bit velocity latches 92 and 94. Again this occurs during each clock period on the signal CLK 1. The highest output bit from the velocity register, which is the highest output bit of the latch 92, is a sign indication indicating the value of velocity, positive or negative. This value is an input to the adders 120 through 126 which are summed with the higher sixteen-bits of value in the position register. In a manner similar to the velocity register, a position readout capability is provided by the tri-state position output buffer latches 144 through 150, which can be strobed by the computer through the use of the line XFEROUT and the appropriate enabling line P1 through P4, so that the value on the position register can also be read by the computer any time as appropriate.

Separately, but not shown, the position of each stepping motor may be preferably monitored by an optical position encoder mechanically following the motion of each stepping motor. Suitable digital interface circuitry may then be connected to the optical encoders so that their output can be sampled by the computer. The computer can then periodically compare the output of the optical encoders with the values in the velocity and position registers in the circuit of FIG. 2 to double-check proper operation of the stepping motor in the physical world.

It is the position register that controls the actual operation of the drive circuitry. The seven most significant bits from the latch 140 and the three least significant bits from the latch 138 are provided as an input to the ROM 152. The ROM 152 is provided with a programming which is, in essence, a look-up table for the sine function. Thus the output of ROM 152 is simply a sine function of the value presented at its input. This value is converted by the digital to analog converter 154 to create a sine wave output amplified by the amplifier 156. The adder 162 simply adds a quarter cycle, or pi divided by 2, to that numerical value which is presented to the ROM 160. This is intended to generate a cosine function. A cosine table could be used for the ROM 160 instead of altering the input value when using a sine table, but doing it in this fashion allows the same table to be used in both ROMs 152 and 160. Again the output of ROM 160 is converted to an analog signal by the converter 164 and amplified by amplifier 166.

In a robot such as that illustrated in FIG. 1, there must be three of the controllers as illustrated in FIGS. 2 and 3. There is one controller for each motor and one motor for each of the three directions, x, y and z, in which the robot may be manipulated. The output signals of the controller, as illustrated in FIG. 2, consist of two signals which are 90 degrees out of phase. The relative phase between those signals determines the direction of rotation of the stepping motors. Illustrated in FIGS. 4 through 5 is a typical drive circuit for one of those phases. In other words, there must be two of the drive circuits of FIGS. 4 through 6 for each motor and thus six of the drive circuits to operate all three motors for a three-dimensional robotic movement. In FIG. 4 is illustrated a drive circuit for operating a stepping motor under the control of the controller of FIGS. 2 and 3. A sine or cosine input signal 158 or 168 is connected as an input to the circuit of FIG. 4. Appropriate diodes and resistors are connected between the analog supply voltages (±15 volts) to clamp the input voltage to ensure that it does not exceed fifteen volts from ground. The input signal 158 or 168 is then connected through a resistor 204 to the inverting input of an operational amplifier 206. The non-inverting input to the operational amplifier 206 is connected through a resistor 208 to ground. The output of the operational amplifier 206 is connected to a feedback resistor 210 which is also connected to its non-inverting input. The output of the operational amplifier 206 is connected through a series circuit of a capacitor 210 and a resistor 214 to the inverting input to a second operational amplifier 216. A resistor 218 is also connected in parallel with the series circuit of the capacitor 212 and resistor 214. The non-inverting input to the operational amplifier 216 is connected to ground. A feed back resistor 220 is connected between the output of the operational amplifier 216 and its inverting input.

The output of the second stage amplifier 216 is connected through a resistor 222 to a third stage chopping amplifier 224. The third stage amplifier 224 controls the operation of the remaining components in the circuit of FIG. 4. The circuit of FIG. 4 includes two lower chopping circuits 226 and two upper chopping circuits 228. The two lower chopping circuits 226 are identical, and the details of these circuits are illustrated in FIG. 5. The two upper chopping circuits 228 are also identical and the details of those circuits are illustrated in FIG. 6.

Returning to the third stage amplifier 224, a feed back resistor 230 is connected between its output and its inverting input. The output of the third stage amplifier 224 is connected through a resistor 232 to a Schmitt trigger inverter 234. A pair of resistors 236 and 238 also connect the input to the Schmitt trigger to the supply voltage and ground respectively. A capacitor 240 is connected between the output of the Schmitt trigger 234 and the logic supply voltage (+5 volts). The output of the Schmitt trigger inverter 240 is fed directly as an input to the lefthand lower chopping circuit 226 and is inverted by a second Schmitt trigger inverter 242 before it is fed as an input to the righthand lower chopping circuit 226. Therefore each of the lower chopping circuits 226 always receives an input signal which is the inverse of the signal being applied to the other lower chopping circuit. Each of the lower chopping circuits 226 acts to, in essence, selectively connect one of a pair of circuit nodes 244 and 246 to ground. The circuit node 244 is connected to one side of one of two inductors 248 and 250 constructed by winding of ten turns per inch of number 12 copper wire with Vitrotex insulation totalling 34¾ turns on an AB U-3250S011A core. The circuit node 246 is connected to one side of a similar inductor 250. The other side of each of the inductors 248 and 250 is connected to one side of an output capacitor 252. The terminal nodes on the opposite sides of the capacitor 252, indicated at 254, are the connections to the stepping motor. The circuit node 246 is connected through a resistor 256 and then a resistor 258 to the inverting input to the third stage amplifier 224. A capacitor 260 joins the junction of the resistors 256 and 258 to ground. Similarly, the circuit node 244 is connected through a resistor 262 in series with a resistor 264 to the non-inverting input to the third stage amplifier 224, and the junction of the resistors 262 and 264 is connected through a capacitor 266 to ground. The left lower chopping circuit 226 is connected to ground through a resistor 268, which is a 0.1 OHM resistor used to measure the current flow through the lower chopping circuit 226. The voltage created above the resistor 268 is connected through a resistor 70 in series with a resistor 272 to the inverting input to the third stage amplifier 224. The junction of the resistors 270 and 272 is connected by a capacitor 274 to ground. Similarly, the right hand lower chopping circuit 226 is connected through a 0.1 OHM resister 276 to ground and the voltage on resistor 276 is connected through resistors 278 and 280 to the non-inverting input to the third stage amplifier 224, and a capacitor 282 connects the junction of the resistors 278 and 280 to ground. A resistor 284 also has one side connected to the non-inverting input to the third stage amplifier 224 and its other side connected to the wiper of a potentiometer 286, the ends of which are connected to plus fifteen and minus fifteen volts. Each of the lower chopping circuits 226 creates an upper chopping control signal, designated 288, which it provides to the respective upper chopping circuit 228 on the opposite side of the circuit. In other words, the right hand lower chopping circuit 226 controls the operation of the left hand upper chopping circuit 228 and vice versa. A 100 volt DC supply is connected through an inductor 290 to a supply node 292 which is connected through a pair of identical fused links 294 to each of the upper chopping circuits 228. A high resistance resistor 296 and a capacitor 298 are connected between the high voltage node 292 and ground. Fused links 300 are also provided between each of the respective circuit nodes 244 and 246 and the respective lower chopping circuits 226.

Figure 4:
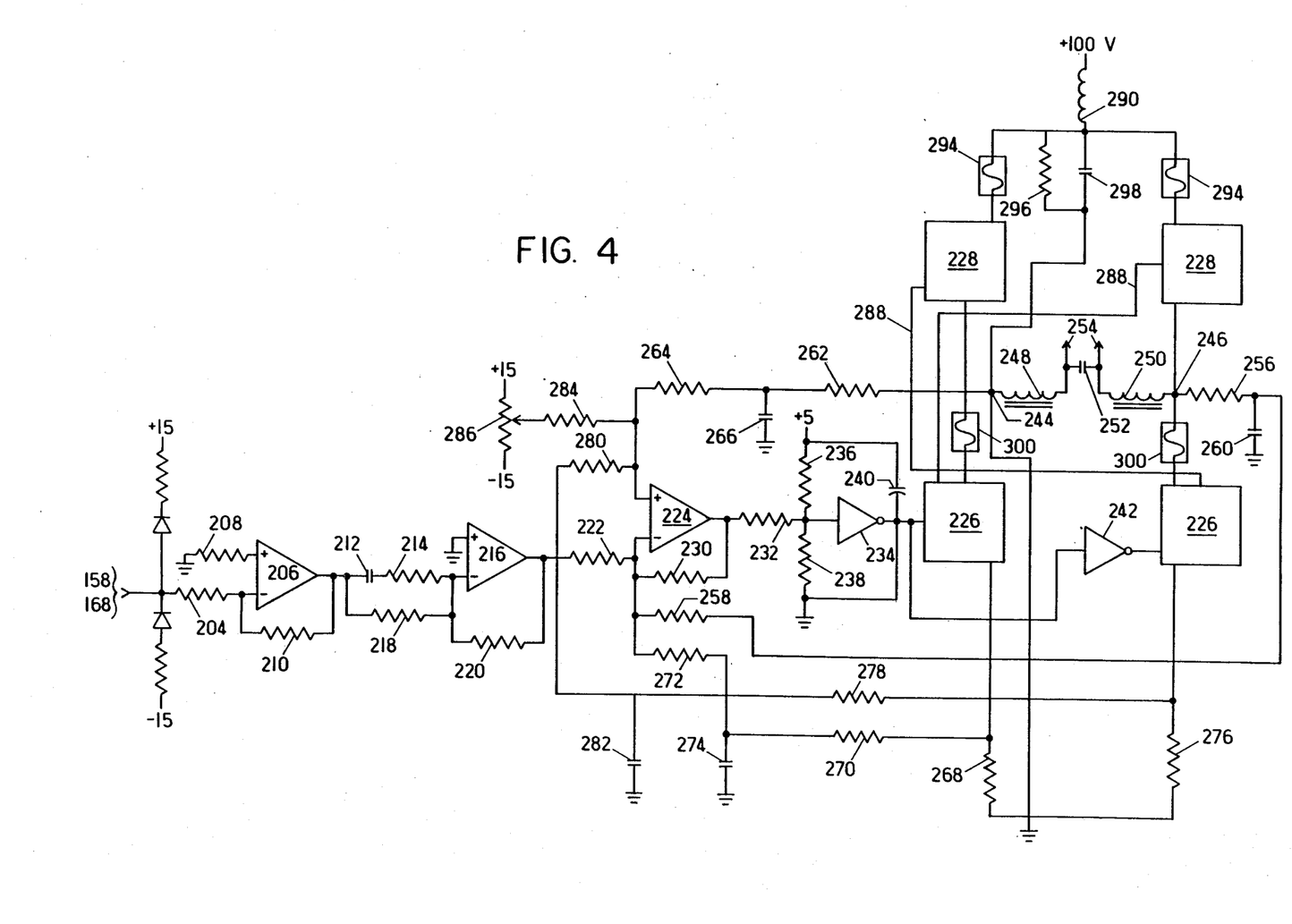
FIG. 4 is a schematic circuit diagram of the stepping motor driving circuit for use with the controller circuit of FIG. 2.
Figure 5:
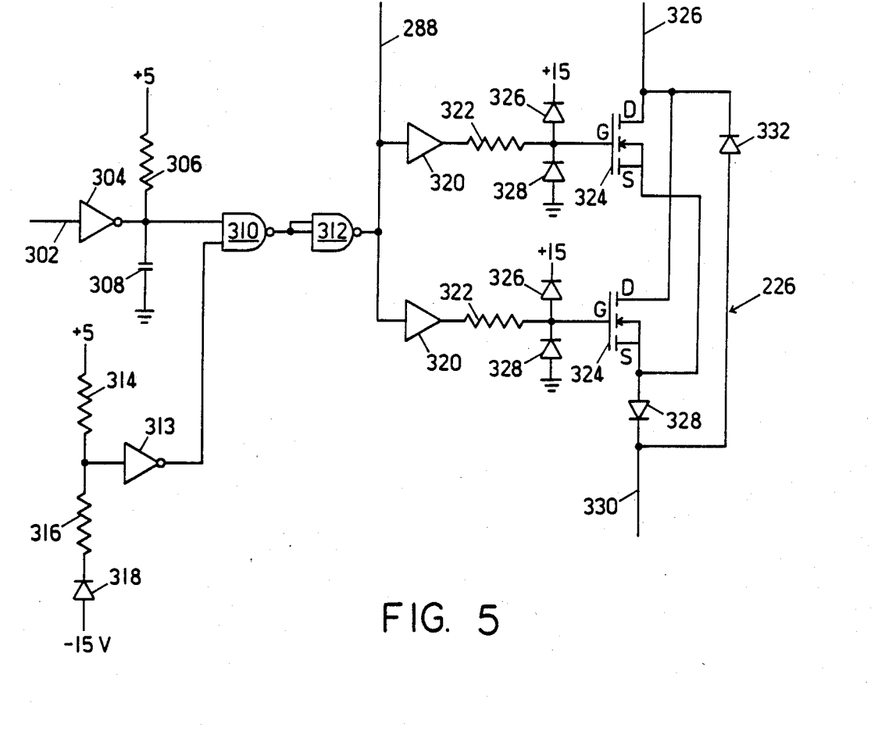
FIG. 5 is a schematic circuit diagram of a lower chopping circuit contained within the circuit of FIG. 4.

Illustrated in FIG. 5 is a one of the lower chopping circuits 226. The signal line 302 which is an input to the lower chopping circuit 26 is the output of one of the Schmitt inverters 234 or 242 as illustrated in FIG. 4. That input is inverted by an inverter 304 and the output is connected to the positive supply by a resistor 306 and to the ground by a capacitor 308. The output of the inverter 304 is then fed as one of the inputs to a two input NAND gate 310. The other input to the NAND gate 310 is the output of an inverter 312, the input to which is wired to the supply voltage by a resistor 314 and also connected through a resistor 316 and through a back biased Zener diode 318 to negative fifteen volts. The output of the NAND gate 310 is inverted by the gate 312 to create the output upper chopping signal 288. The output signal 288 is also connected as an input to a pair of identical drivers 320. The output of each of the drivers 320 is connected through a one of respective identical resistors 322 to the gate of one of a pair of MOSFETS 324. The gate terminal of each of the MOSFETS 134 are clamped by a pair of diodes 326 and 328 so as to remain between ground and fifteen volts. The drains of the two MOSFETS 324 are connected together to a signal line 326 which is connected to the fuse link 300 seen in the circuit of FIG. 4. The source terminal the two MOSFETS 324 are connected together and connected to the anode of a diode 328, the cathode of which is connected to a signal line 330 which is connected out of the lower chopping circuit 226 to the respective resistor 268 or 276 as seen in FIG. 4. A diode 332 is connected with its cathode to the signal line 326 and its anode connected to the signal line 330 to protect the MOSFETS 324.

Shown in FIG. 4 are the details of one of the two identical upper chopping circuits 228. An input to the upper chopping circuit 228 is a line 334 which is connected to the fuse 294. The line 334 is connected through a diode 336 and a resistor 338 to the drain of an FET 340. A resistor 342 is connected between the drain and gate of the FET 340 and a Zener diode 344 is connected between the gate of the FET 340 and a circuit junction 346. The source of the FET 340 is connected as the supply voltage input to a voltage regulator 348. The ground terminal of the voltage regulator 348 is connected to the circuit junction 346. A capacitor 350 and a series connection of a resistor 352 and an LED 354 are also connected between the source of the FET 340 and the circuit junction 346. The output of the voltage regulator 348 is fed as the supply voltage to an optical isolator 354. The regulated output voltage of the voltage regulator 348 also has a capacitor 356 connected across and parallel with the series connection of a resistor 358 and an LED 360. The input upper chopping signal 288 to the upper chopping circuit 228 is connected to the cathode of the LED portion of the optical isolator 358. The anode of the LED of the optical isolator 354 is connected through a resistor 362 to the positive supply. The optical isolator 354 is connected with its ground terminal connected to the circuit junction 346. The output of the optical isolator 354 is connected through a resistor 364 to the regulated voltage from the voltage regulator 348 and is also connected as an input to a pair of identical drivers 366. The drivers 366 are contained in a common integrated circuit, the supply voltage of which is connected to the source of the FET 340 and the ground terminal of which is connected to the circuit junction 346. The circuit junction 346 is nowhere connected to the ground of FIG. 4. The output of each of the drivers 366 is connected through a respective resistor 368 and to the gate terminal of one of two MOSFETS 370. Again a pair of diodes 372 and 374 are connected to the gate terminal and to the local supply and to the circuit junction 346 to clamp the input voltage within constrained limits. The drain terminals of the two MOSFETS 370 are joined together to the circuit junction 334. The source terminal for the two MOSFETS 370 are connected together and through a diode 376 to the circuit junction 346. A second diode 378 is connected across the MOSFETS 370 to prevent back biasing.

Figure 6:
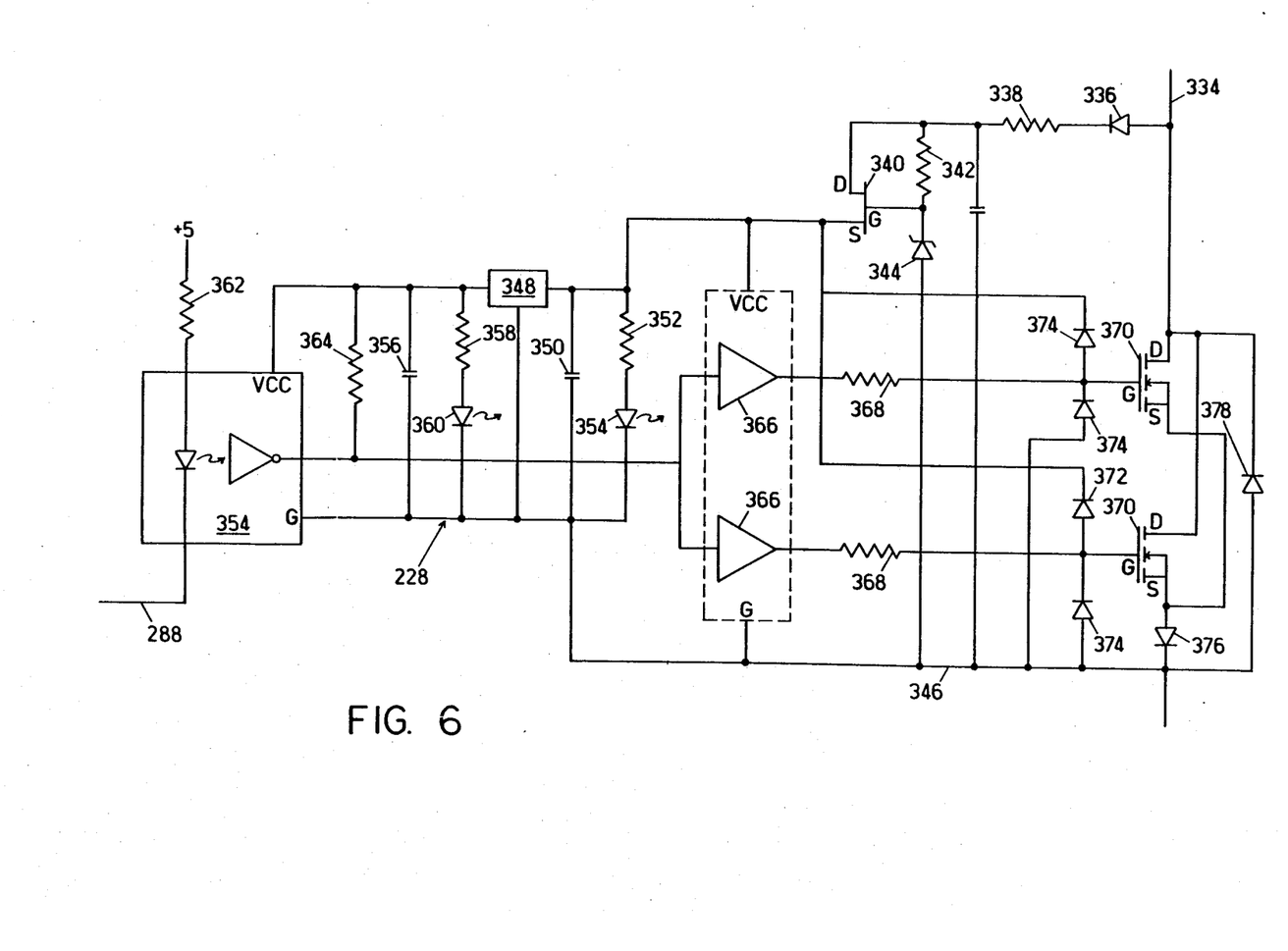
FIG. 6 is a schematic circuit diagram of an upper chopping circuit for use within the circuit diagram of FIG. 4.
Figure 7:
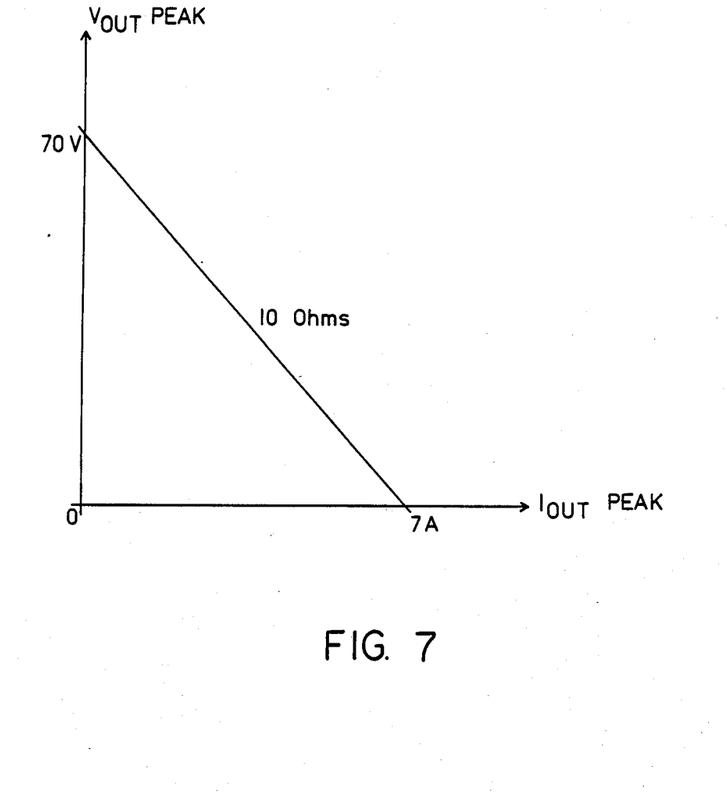
FIG. 7 is a graph illustrating the design output impedance goal of the present device.

In its operation, the stepping motor drive circuit of FIGS. 4, 5 and 6 is intended to provide smooth operation and control of stepping motors beginning with a low impedance sine or cosine signal at a frequency of between 0 and 1 kilohertz. The stepping motor drive circuit is designed to have a defined output impedance so as to gain the best damping of mechanical vibration which might result in back EMF from the motor. The design constraints were selected to give a relatively constant output impedance of 10, ohms with a maximum voltage at 0 current of 70 volts and a maximum current at 0 voltage of 7 amps. A graph of the design output impedance characteristic is illustrated in FIG. 7. The circuit was designed so as to smoothly and efficiently drive the motor with maximum torque while providing maximum safety and reliability for the system, with suitable fail-safes so that inadvertent high voltage operation of the motor is completely avoided. To lessen power dissipation needs on the switching MOSFETs, the circuit chops at a relatively high frequency to alternate which MOSFETs are conducting the driving current.

In detail, the circuit of FIG. 4 begins with a first amplification stage at amplifier 206. The first stage amplifier 206 and the second stage amplifier 218 together form an input amplifier to provide a reasonable input impedance and to provide a gain in the input signal which exits therefrom. The first stage amplifier 206 has an input impedance defined by the resistor 204 and, with properly selected resistive components, is intended to give a voltage gain of minus 1.4. The second stage amplifier, of which the principal component is the amplifier 216, is to compensate for the design parameter that the driver is to have an output impedance of 10 ohms while it must drive an inductive load, i.e. the motor, of about 3 millihenries. Normally the values of resistors 218 and 220 may be equal to give a unitary amplification so that the result at the output of the second stage amplifier 216 is 1.4 times the input voltage to the circuit of FIG. 4.

The third stage chopping amplifier is built around the operational amplifier 224 and includes the Schmitt trigger 243 to generate the inputs to the lower chopping circuits 226. This amplifier receives feed back from the output current and output voltage fed to the stepping motor to cause the driver circuit of FIG. 4 to have an effective output impedance of 10 ohms. The amplifier 224 is therefore confined, by appropriate feed back loops, to operate so as to create that effective output impedance. When the circuit of FIG. 4 is providing current to the motor, the current flow will be from the 100 volt DC source, through either the left hand or the right hand upper chopping circuit 228, then through the appropriate circuit node 244 or 246 through the motor to the other of the two circuit nodes, and then through the lower chopping circuit 226 opposite from the upper chopping circuit 228 which is enabled, and then through the resistor 268 or 276 to ground. The upper chopping signals 288 controlling the operation of the upper chopping circuits 228 are controlled by the opposite lower chopping circuits 226 so that the right lower chopping circuit 226 is operated at the same time as the left upper chopping circuit 228 and the left lower chopping circuit 226 controls the operation of the right upper chopping circuit 228. Since current flows through the resistors 268 and 276 to ground, the voltage across those resistors will be always proportional to the current flow through the motor. Thus the resistors 268 and 276 are preferably selected to be low resistance resistors which may be used principally for voltage measurement, such as 0.1 ohm resistors. Thus the feed back path consisting of resistors 270 and 274, and the appropriate counterpart feed back circuit consisting of resistor 278 and 280, are each intended to feed back to the amplifier 224 the value of the output current then being supplied to the motor. The provision for the capacitors 274 and 282 is to reduce filter and switching hash at high frequencies above 1 megahertz. The combined resistance of the series resistors 270 and 272 or 278 and 280 is approximately 100 ohms. Similarly, a voltage feed back loop is connected to the third stage amplifier 224 and includes series resistors 256 and 258 and 262 and 264. These resistors are to provide feed back of the voltage currently being applied to the motor since, as it may be observed, the total voltage being applied to the motor at any instance is the voltage between the circuit nodes 244 and 246. Again a capacitor, respective capacitors 260 and 266, are added to reduce noise and transient effects during switching. The combined resistance of the series resistors 256 and 258 and 262 and 264 is selected to be approximately 10K ohms.

The combination of the current feed back and voltage feed back loops as constructed in this fashion confine the output of the third stage amplifier 224 to cause the circuit to have an effective output impedance of 10 ohms.

The output from the third stage operational amplifier 224 is connected through the resistor 232 to the Schmitt trigger inverter 234, which is intended to actually switch the lower chopping circuits 226. The Schmitt thresholds are selected to be 0.85 and 1.65 volts. Therefore the voltage swings of the third stage amplifier 224 are, in effect, digitized by the Schmitt trigger 234 to produce the chopping signals to the lower chopping circuits 226. The purpose of the symmetrical chopping circuits 226 and 228 is to switch the MOSFETs carrying the motor current by alternating the voltage applied to the inductors 248 and 250 so that current from the supply increases steadily then, when reversed, flows back to the supply and diminishes. This circuit uses the output capacitors on the voltage supply for the 100 volts DC as a storehouse of back EMF energy rather than trying to absorb those oscillations or damp them electronically in the circuit. Thus, during the cycle, current is alternately drawn from the supply and then returned to it. As long as the 100 volt supply can handle the return current in its storage capacitors, this allows the circuitry of FIGS. 4 through 6 to be relatively compact in spite of the relatively high demands of a 7 AMP output at 100 volts. The actual timing of the switching so that current flows back to the source is determined by the operation of the third stage amplifier 224 through the Schmitt trigger 234 and, of course, the operation of the amplifier 224 is determined by the relative selection of the values of its feed back components. Note that the Schmitt trigger 242 serves to invert the output of the Schmitt trigger 234 so that the lower chopping circuits 226 are always operating in opposite time sequence from each other and that one is always off when the other is on.

Shown in FIG. 5 are the details of the lower chopping circuits. In essence, the circuits are relatively straight forward drivers intended to drive two FETS 324, wired in parallel, to allow current flow between the lines 326 and 330. The RC circuit created by the resistor 306 and the capacitor 308 is intended to provide a small (approximately 500 nanosecond) pause or delay when turning on the lower chopping circuit. The purpose of this is to avoid a short to ground. Since the delay pause is only instituted when the respective lower chopping circuit 226 is turning "on," the provision for the time delay will ensure that the other lower chopping circuit and the adjacent upper chopping circuit are both appropriately turned off before the lower chopping circuit being turned on turns fully on. This is to prevent short circuit to ground. The gates 310 and 312 may also be Schmitt trigger logic circuits and are intended both to clean up the output of the RC timing circuit of 306 and 308 and to be controlled by the output of the inverter 312, which serves to turn off the gates 310 and 312 and prevent operation of the lower chopping circuit 226 if for any reason the minus 15 volt supply voltage is interrupted. The signal generated on upper chopping signal line 288 is passed through the drivers 320 to turn on the MOSFETS 324. It is also the signal on the same line 288 that causes the respective opposite upper chopping circuit to turn on. It is through this signal line 288 that the circuit of FIG. 4 operates to ensure that when the left lower chopping circuit 226 operates the right upper chopping circuit 228 and when the right lower chopping circuit 226 operates it operates the left upper chopping circuit 228. In either lower chopping circuit 226, the signal line 288 is transferred to the drivers 320 to operate the FETS 324 to turn them on and off directly.

By referring to FIG. 6 the details of operation of one of the two identical upper chopping circuits 228 may be seen. The input signal from the line 288 is connected through the optical isolator 354 to electrically isolate the input signal from the remaining components of the upper chopping circuit 228. Note, in particular, that the upper chopping circuit 228 is not connected to the circuit ground of the circuit of FIG. 4. Instead, all of the components of the upper chopping circuit 228 are connected to a local ground consisting of the circuit junction 346. In other words, these components are at a "floating" ground. This makes the upper chopping circuit 228 independent of the actual supply voltage, as long as it is above a minimum. The output of the operational amplifier 354 again drives a pair of drivers 366 the output of which is transmitted directly to control the operation of the MOSFETS 370. The voltage regulator 346 is simply to provide a regulated five volts floating above the floating ground for the optical isolator 354. The FET 340 supplies a floating supply of 15 volts above the floating ground for the remaining components of the upper chopping circuit 228.

The circuit of FIGS. 4 through 6 is particularly designed so that no instance of power supply failure or no order of operating any of the power supplies in turning them off or turning them on will cause a failure of the system or high current flows through the FETS or to the motor. If the plus 5 voltage supply fails, the signals on the signal lines 288 are not driven, and the non-inverting drivers 320 and 366 fail to operate thereby holding the MOSFETS 324 and 370 off. If the plus 15 voltage supply fails, the non-inverting drivers 320 and the lower chopping circuit 226 fail off, preventing current flow. If the minus 15 voltage supply fails, again the signals on the signal lines 288 are a logical 0, because of the input from the inverter 312, and again all MOSFETS 324 or 370 are gated off. If the plus 100 voltage supply fails or drops too low, the system will continue to operate until the floating 15 volt supply created by the FET 340 and the upper chopping circuits 228 fails, in which case the system will fail safe off.

The provision for the inductors 248 and 250 is to filter the output of the circuit so that the chopping frequency of the operation of the upper and lower chopping circuitries 226 and 228 is bypassed and the driver not sent to the stepping motor. The system design is a 50 kilohertz chopping frequency when connected to a 3 millihenry inductive load. The inductors 248 to 250 were constructed as to have a total effective inductance of about 420 microhenries with a capacitor 252 having a value of 0.47 microfaras to achieve the desired filtering. In essence, the filtered output to the nodes 254 apply to the stepping motor is a constant voltage having a slight variation at the chopping frequency. Thus, in summary, in the circuit of FIG. 4, the input is amplified by the first and second stage amplifiers using the operational amplifiers 206 and 216 until the input to the third stage amplifier 224. The third stage amplifier 224 is a feed back amplifier which, in essence, controls the entire remaining portions of the circuitry. The feed back which is summed by the third stage amplifier 224 includes the output of the amplifier 216 and the instantaneous current and voltage values of current flow through the motor. In essence, the amplifier 224 provides a chopping output as the output voltage of the driver oscillates near the desired voltages determined by the output of the amplifier 216. The operation of the chopping of the third stage amplifier 224 is determined by its various feed back components responsive to the output voltage and current. The output of the amplifier 224, digitized by the Schmitt trigger 234, creates a chopping signal which alternatively operates either the left lower chopping circuit 226 in conjunction with the right upper chopping circuit 228 or operates the right lower chopping circuit 226 in conjunction with the left upper chopping circuit 228.

It is to be understood that the present invention is not limited to the particular construction and arrangement of parts illustrated and described herein, but embraces all such modified forms thereof as come within the scope of the following claims.

I claim:

1. A stepping motor control circuit for operating a stepping motor under the control of a digital computer, the stepping motor having at all times a current velocity and a current position, the circuit comprising
    an input latch connected to receive two input values from the computer, one input value being desired velocity and the other input value being rate of change of velocity;
    a velocity register holding a value corresponding to the current velocity of the stepping motor;
    an adder to add the value of the rate of change of velocity to the value in the velocity register;
    a position register holding a value corresponding to the current position of the stepping motor;
    an adder to add the value of the current velocity to the value in the position register;
    a digital-to-analog converter to convert the value in the position register to an analog voltage for the motor; and
    a drive circuit connected to the output of the digital-to-analog converter to receive the analog output thereof and amplify it to drive the stepping motor.

2. A control circuit as claimed in claim 1 wherein the input values of desired velocity and rate of change of velocity are each sixteen bit values and wherein the input latch comprises four eight bit latches.

3. A control circuit as claimed in claim 2 wherein each eight bit input latch has connected to it a respective eight bit input buffer latch, the input buffer latches all connected to a common data bus and also connected to be selectively enabled by the computer to receive data.

4. A control circuit as claimed in claim 1 wherein there is a comparator connected to the input latch and the velocity register to disable the adder adding the rate of change of velocity to the velocity register if the value in the velocity register is equal to the value of the desired velocity.

5. A control circuit as claimed in claim 1 wherein there is a velocity output buffer latch connected to the velocity register to hold and present the value in the velocity register to the computer.

6. A control circuit as claimed in claim 1 wherein there is a position output buffer latch connected to the position register to hold and present the value in the position register to the computer.

7. A control circuit as claimed in claim 1 wherein the adder to add the value of the rate of change of velocity to the value in the velocity register is connected so as to add the rate of change of velocity value repetitively to the least significant bits of the value in the velocity register so that the velocity value is incrementally changed.

8. A control circuit as claimed in claim 1 wherein the adder to add the value in the velocity register to the value in the position register is connected so as to add the velocity register value repetitively to the least significant bits of the value in the position register so that the position value is incrementally changed.

9. A control circuit as claimed in claim 1 wherein there is a ROM connected between the position register and the digital-to-analog converter to convert the numerical position value to a radial value.

10. A control circuit as claimed in claim 9 wherein there are two digital-to-analog converters and two ROMs connected so that one ROM generates a sine function and the other a cosine function of the same radial value.

11. A control circuit as claimed in claim 1 wherein the drive circuit includes parallel chopping circuits to alternatively drive the motor.

12. A stepping motor drive circuit to operate a stepping motor with energy from a power supply comprising
an input amplifier connected to present a selected input impedance to the motor;
a summing feedback amplifier connected to receive feedback proportional to the voltage and current values applied to the motor to generate a chopping signal;
a pair of upper and a pair of lower chopping circuits, the upper chopping circuits connected between the power supply and the motor, and the lower chopping circuits connected between the motor and ground, the chopping circuits connected to operate in response to the chopping signal so that only one upper chopping circuit and an opposite lower chopping circuit are operating at any one time.

13. A drive circuit as claimed in claim 12 wherein each upper chopping circuit is not connected to ground, the components therein being only connected to a local ground, so that the upper chopping circuit can function at a fluctuality system voltage.

14. A drive circuit as claimed in claim 13 wherein each upper chopping circuit receives an input through an optical isolater, the input to which is a signal from the opposite lower shipping circuit so that proper synchronous operation of the upper and lower chopping circuits is maintained.

15. A drive circuit as claimed in claim 13 wherein the upper chopping circuit includes its own regulated power supply creating a supply voltage relative to the local ground.

16. A drive circuit as claimed in claim 12 wherein each lower chopping circuit has time delay generator connected to its input to delay turn on of each said lower chopping circuit to ensure that the other lower chopping circuit turns completely off before said chopping circuit.

17. A drive circuit as claimed in claim 12 wherein the voltage feedback to the summing amplifier is provided by a pair of resistors each connected at one end to a respective connection between one of the upper chopping circuits and the motor and at another end to the summing amplifier.

18. A drive circuit as claimed in claim 12 wherein the current feedback to the summing amplifier is provided by feedback resistors connected to a low voltage series resistor in series with the motor.

19. A drive circuit as claimed in claim 12 wherein there are a pair of inductors connected between the chopping circuits and the motor to filter oscillations from the voltage applied to the motor.

* * * * *